United States Patent
Akashi et al.

[11] Patent Number: 4,655,830
[45] Date of Patent: Apr. 7, 1987

[54] HIGH DENSITY COMPACTS

[76] Inventors: Tomotsu Akashi, 1219 Apache; Akira Sawaoka, 511 Mesa Loop, both of Socorro, N. Mex. 87801

[21] Appl. No.: 747,558

[22] Filed: Jun. 21, 1985

[51] Int. Cl.$^4$ ............................................. C22C 29/12
[52] U.S. Cl. ........................................ 75/233; 75/230; 75/235; 75/236; 264/60; 264/65; 264/84; 264/125; 264/DIG. 36; 501/98; 501/96; 501/88; 419/4 B; 419/66; 419/45; 100/911
[58] Field of Search ................. 419/48, 45, 66; 72/56; 75/230, 233, 235, 236; 264/60, 65, 84, 125, DIG. 36; 501/88, 96, 98; 100/911

[56] References Cited
U.S. PATENT DOCUMENTS

| | | | |
|---|---|---|---|
| 3,023,462 | 3/1962 | Taylor et al. | 264/84 |
| 3,178,807 | 4/1965 | Bergmann | 264/84 |
| 3,220,103 | 11/1965 | Simons | 264/84 |
| 3,269,826 | 8/1966 | Bumgarner | 264/84 |
| 3,876,757 | 4/1975 | Alexecvsky et al. | 264/84 |
| 3,909,909 | 10/1975 | Whalen | 419/28 X |
| 4,201,757 | 5/1980 | Corrigan | 264/84 |
| 4,255,374 | 3/1981 | Lemcke et al. | 419/66 |
| 4,384,834 | 5/1983 | Wichoud | 264/84 |
| 4,490,329 | 12/1984 | Hare et al. | 419/51 |

Primary Examiner—Stephen J. Lechert, Jr.

[57] ABSTRACT

This invention relates to the manufacture of compacts of ceramic composition, cermets, and other high hardness materials by applying explosive shock during exothermic sintering of such powders.

11 Claims, 23 Drawing Figures

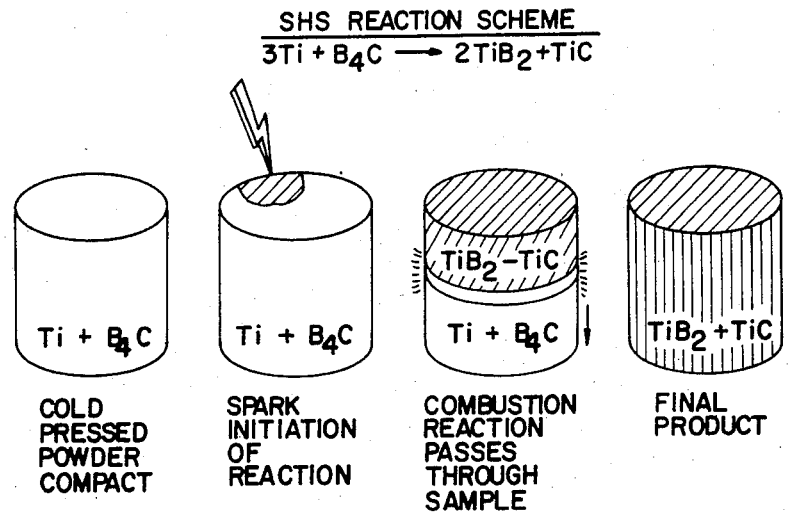
FIGURE 1. SHS REACTION SCHEME
FIGURE 2. RELATION OF SHS CHARACTERISTICS TO THE PHYSICAL AND CHEMICAL PROPERTIES OF THE STARTING MATERIALS.

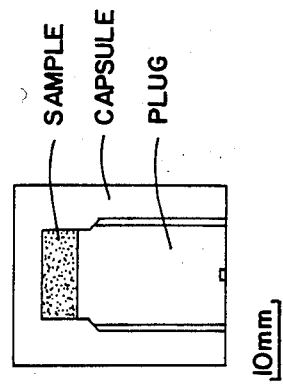
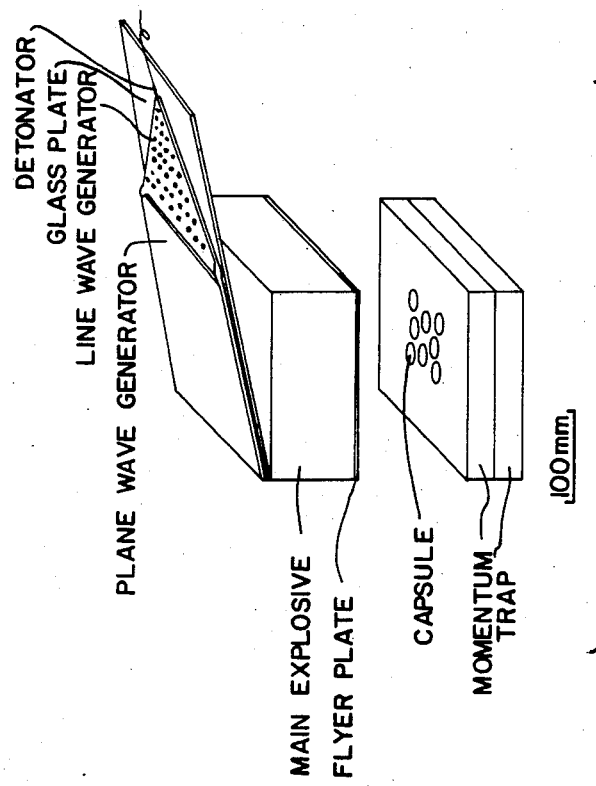
FIGS. 3A & 3B. ASSEMBLY FOR SHOCK COMPRESSION EXPERIMENTS
(3A) PLANE SHOCK WAVE GENERATOR AND MOMENTUM RECOVERY SYSTEM
(3B) STAINLESS STEEL CAPSULE SEM photograph of starting powder, Ti powder SEM photograph of starting powder, carbon powder SEM photograph of starting powder mixture of Ti and carbon powders

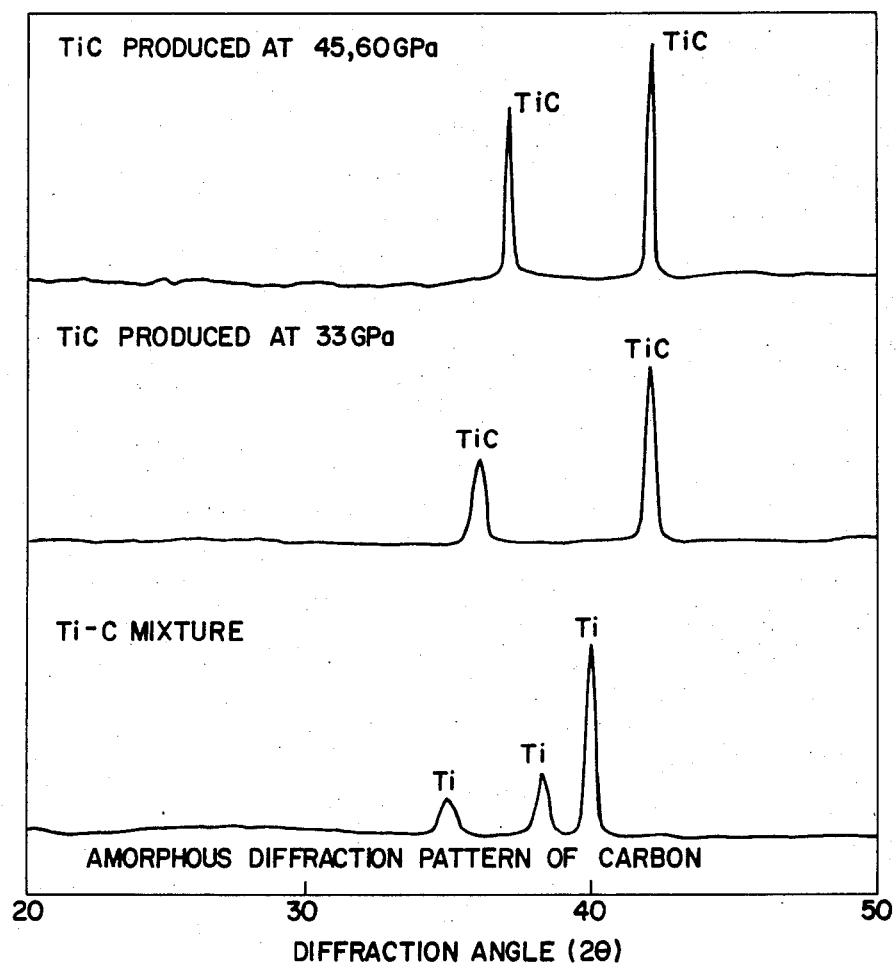
FIG. 5. X RAY DIFFRACTION PATTERNS FOR MIXED POWDER AND RESULTING TiC COMPACTS PRODUCED AT 33, 45 AND 60GPa

FIG. 6

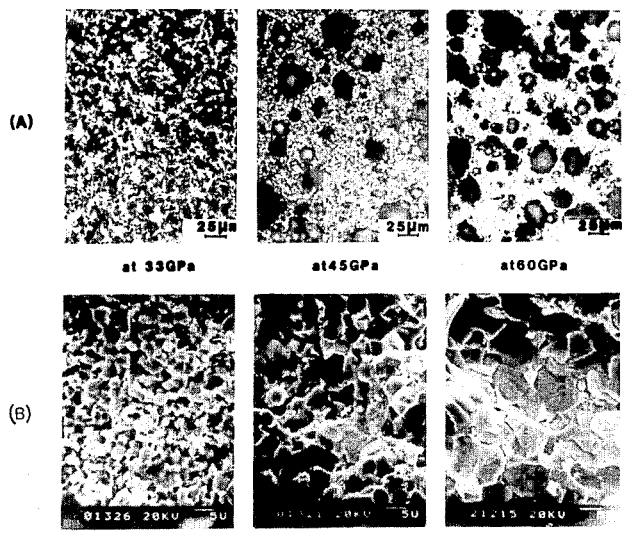

Optical and SEM photographs of resulting TiC compacts produced at 33, 45, and 60 GPa.
(A) Optical photograph of polished surface of TiC compact
(B) SEM photograph of fracture surface of TiC compact

FIG. 7

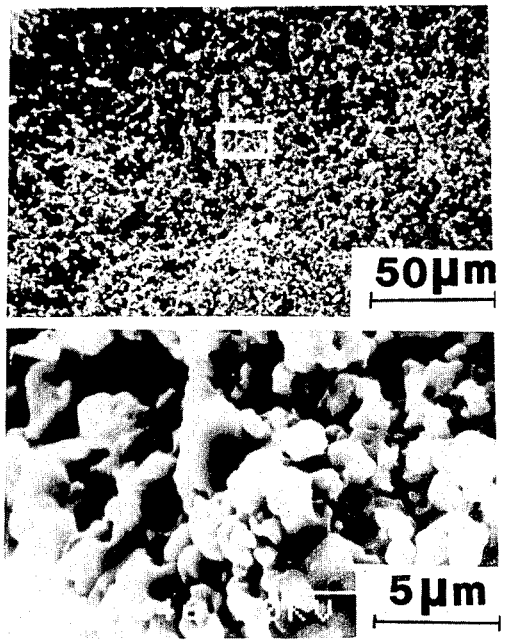

SEM photograph of fracture surface of compact produced from TiC-Ti-C mixture at 60GPa.

FIG. 9

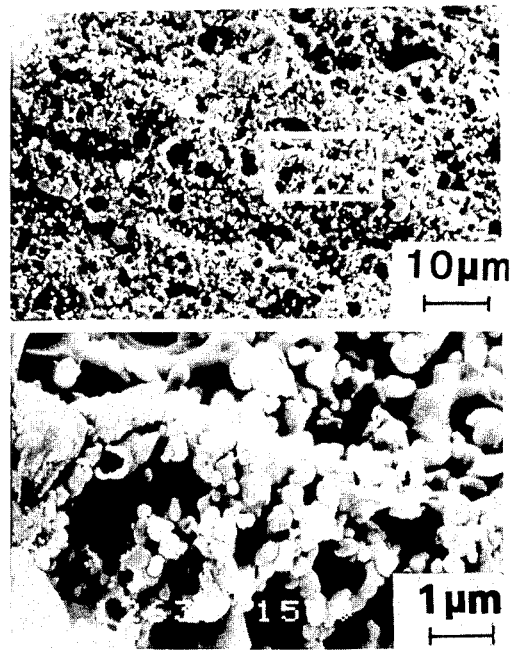

SEM photograph of fracture surface on TiC-Al$_2$O$_3$ compact produced from TiO$_2$-C-Al mixture at 45GPa.

FIG. 8. X RAY DIFFRACTION PATTERNS OF MIXED POWDER AND RESULTING TiC-Al₂O₃ COMPACT.

EXOTHERMIC MATERIALS:
Ti-C, TiO₂-C-Al
SiC POWDER COMPACT

FIG. 10. POWDER ASSEMBLY (A)          (B)

FIG 11 SEM photographs of starting powder and fracture surface on sintered SiC compact FIG 12 Optical photographs of polished surface on SiC sintered compacts produced with and without exothermic heat. (1) Compact without exothermic reaction heat; (2) Compact with exothermic reaction heat.

FIG 13 Optical photographs of polished surface of C-BN composites produced with and without exothermic materials at 60GPa: (1) C-BN composites produced without exothermic materials; (2) C-BN composites produced with exothermic materials.

FIG.13(1)

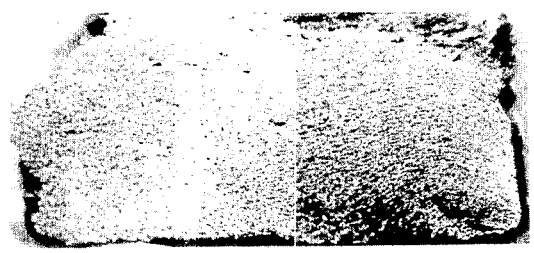

c-BN50-TiC-Al
(57.5%)

A c-BN40-TiC-Al-Ti-C
(57.7%)    (x400) 25um

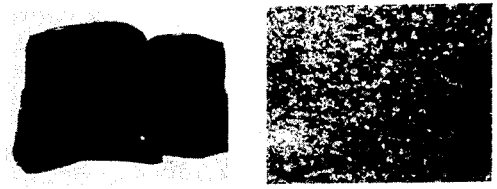

B c-BN40-TiC-Al-Ti-B
(57.5%)

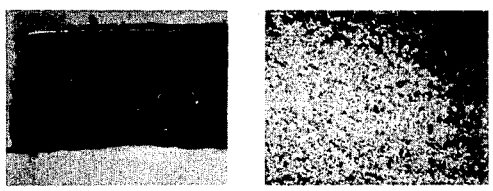

C c-BN80-Ti-B-Ti-Al
(57.5%)

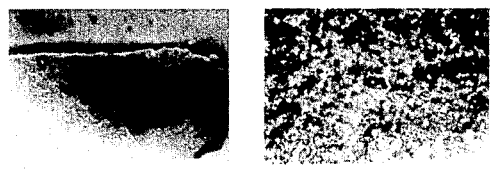

FIG 15 SEM photographs of fracture surface on the compacts of $Al_4C_3$ and $B_4C$ produced at 60GPa.

A) Microstructure of $Al_4C_3$ compact

B

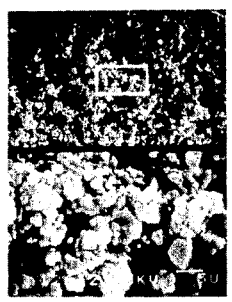

B) Microstructure of B4 compact

FIGS. 14A & 14B. X-RAY DIFFRACTION PATTERNS OF MIXED POWDERS AND RESULTING PRODUCTS IN THE SYSTEM B-C AND Al-C PRODUCED AT 60GPa.
(14A) RESULTS IN THE SYSTEM Al-C
(14B) RESULTS IN THE SYSTEM B-C

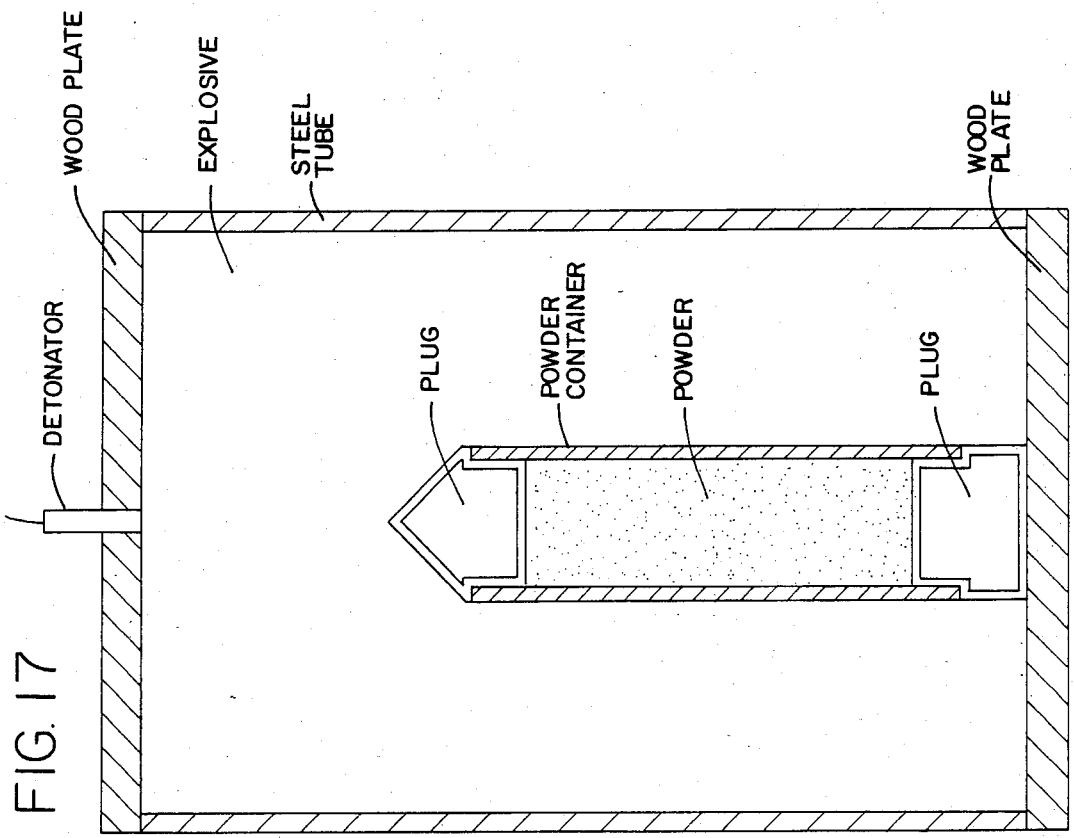
FIG. 17. CYLINDRICAL SHOCK WAVE ASSEMBLY
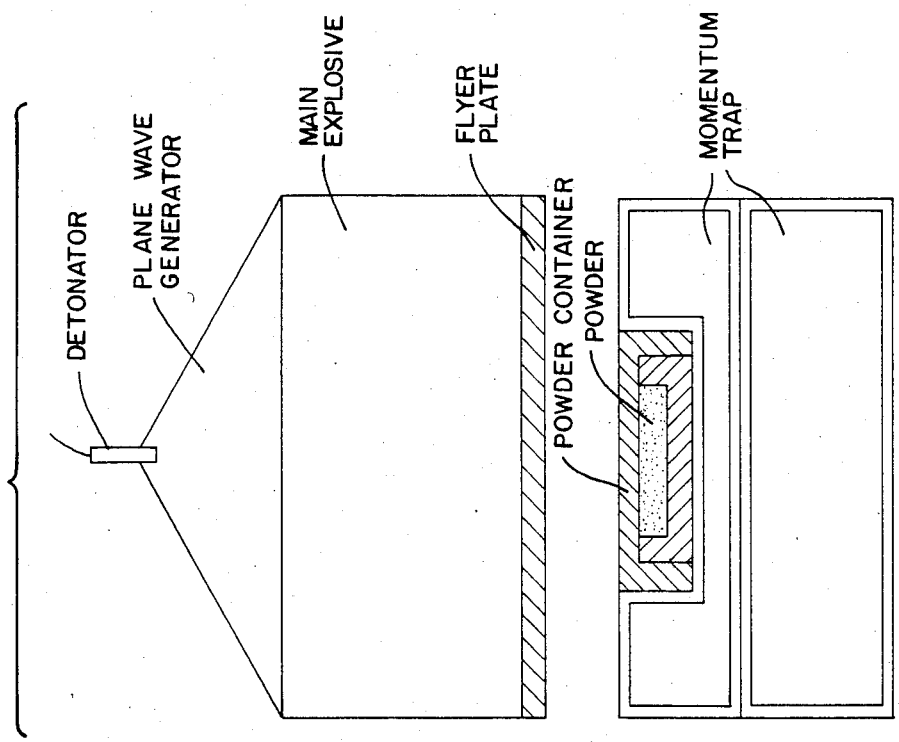
FIG. 16. PLANE SHOCK WAVE ASSEMBLY

HIGH DENSITY COMPACTS

FIELD OF THE INVENTION

This invention relates to the field of high density compacts of refractory ceramics, ceramic composites, cermets and other high hardness materials.

PRIOR ART

The prior art discloses such compact manufacture by heating and compressing the powders. Mechanical pressures have been used. Various heating means have been employed, including ovens and the like. More recently the heating has been achieved by burning exothermic reaction mixtures such as thermite compositions, intermetallic reactions and the like. The exothermic powder has been either mixed in the powder to be compressed, or fired as a separate layer adjacent to the compact.

Typical prior art disclosures are described in the following:

Some kinds of ceramic and cermet materials can be synthesized by utilizing an exothermic reaction between the elemental constituents of these materials without any external heating. This unique processing technique is termed "Self-Propagating High-Temperature Synthesis," and has been abbreviated as SHS, SHTS and SUS. SHS processing has been investigated in the Soviet Union since 1967, and over 200 phases have been produced by this technique. Exothermic reactions have been utilized for many years in the USA for a variety of heat requirements and pyrophoric applications. It is only recently that this processing technique has been explored as a method for synthesis and sintering of ceramics and cermets.

In the SHS processing, a strong exothermic reaction, ignited at one end of the compact of the mixed precursory powders by heating (using electric spark, hot wire, ion beam etc.), propagates spontaneously in the compact as shown in FIG. 1. An example of this reaction is the synthesis of titanium diboride (TiB$_2$) from titanium and boron powders. This reaction can be expressed as:

$$Ti + 2B \rightarrow TiB_2 \quad H = 66.8 \text{ kcal/mol (at 298K)}$$

The adiabatic temperature resulting from this reaction is calculated to be 3190K, which corresponds to the melting point of TiB$_2$, by assuming that all reaction heat contributes to increase the temperature of the reaction product. Table 1 lists the thermodynamic data of some refractory ceramics. The notations of (l) and (s) denote whether the reaction product is liquid or solid at the adiabatic reaction temperature. Self-sustaining reactions can occur only when a produce phase is liquid or partially liquid at the reaction temperature. Therefore, not all exothermic reactions are self-sustaining.

Currently, fundamental research and applications of SHS processing are progressing. A. P. Hardt and P. V. Phung proposed a simple, diffusion-limited, reaction model and evaluated the exothermic reaction rates. Reaction rate depends on two factors: heat transfer sufficiently low to allow accumulation of heat in the reaction zone, and system characteristics of particle size and fusion temperature sufficiently small to promote a high rate of mass transfer.

TABLE 1

THERMODYNAMIC INFORMATION ON PHASES PRODUCED BY SHS.

| PHASE | Tmp (°K.) | Tad (°K.) | ENTHALPY ΔH$_{298}$° (kcal/mole) | HEAT OF REACTION Q (cal/g) |
|---|---|---|---|---|
| TiB$_2$ | 3190 | 3190*(l) | 66.8 | 962 |
| TiC | 3210 | 3210*(l) | 44.13 | 736 |
| SiC | 3100 | 1800(s) | 16.5 | 412 |
| B$_4$C | 2620 | 1000(s) | 13.8 | 250 |
| WC | 3070 | 1000(s) | 8.4 | 43 |
| AlN | 2500 | 2900*(l) | 64.0 | 1560 |
| Si$_3$N$_4$ | 2170 | 4300*(l) | 176.0 | 1260 |
| TiN | 3220 | 4900*(l) | 80.75 | 1300 |

*Tad ≧ Tmp
NOVIKOV, N. P., BOROVINSKAYA, I.P., MERZHANOV, A.G., IN COMBUSTION PROCESSES IN CHEMICAL TECHNOLOGY AND METALLURGY, CHERNOGOLOVKA, (1975), p. 174–188.

Also, they showed experimentally that reaction characteristics can be altered by using suitable additives which alter the thermal conductivity. FIG. 2 shows some influential factors of physical and chemical characteristics of precursory powders on SHS reaction and product. In the area of application research, in 1959, J. D. Walton Jr. and N. E. Poulos applied the thermite reaction to production of high-temperature resistance cermets. Self-bonding zirconium disilicide-aluminum oxide cermets (ZrSi$_2$—Al$_2$O$_3$) were successfully produced from the thermite mixture of ZrO$_2$, SiO$_2$, and aluminum. They reported some advantages of this method of production as follows:

(1) inexpensive precursory powders
(2) low ignition temperature (980° C.)
(3) high reaction temperature (+2760° C.)
(4) short firing time
(5) controlled atmosphere unnecessary Therefore, this technique has a significant meaning for industrial production of ceramics and cermets.

In Am. Cer. Soc. 86th Annual Meeting in 1984, there were seven presentations about thermite reaction and SHS. One of these was about self-sintering of materials in the system Ti—B—C. TiB$_2$, TiC, and these mixtures' compacts formed in this system have a highly potential application to weapon systems. Such materials produced by conventional processes are expensive because powders with suitable properties for sintering are needed, and high-temperature and pressure sintering of these powders are required for producing high strength materials. On the other hand, by SHS processing, it may be possible to produce strong bonded materials with desired phases from precursory powder mixtures by igniting only one end of the compact at room temperature. N. D. Carbin et al. examined the effect of precursory powder characteristics of resulting products in the system Ti—B—C (FIG. 2) and showed that mixtures containing a fine Ti powder are easier to ignite and have slower reaction rates, but products are more porous than those containing coarse powder. Furthermore, reaction rates in the mixtures using B$_4$C for the elements of B and C decreased about 100 times and partially sintered products containing TiB$_2$, TiC were produced. However, hardness values and densities of these products are not clear, but the products seem to be considerably porous.

Recently, high-pressure, self-combustion sintering for ceramics utilizing this SHS processing technique were demonstrated from cooperative research by Osaka University and Sumitomo Electric Industries Ltd. in Japan. Their attempt is to eliminate the pores in products produced by SHS by applying high pressure during the SHS process. It is reported that a dense $TiB_2$ sintered compact was produced in a few seconds by only electric ignition on pressed Ti and B mixture at 3 GPa, and the relative density and microhardness value of the center region in the high pressure reaction cell was 95% and 2000 kg/mm$^2$ for a 200 g load, respectively. This result suggests that application of high pressure to SHS processing is very effective in eliminating pores and has the potential of producing densely strong ceramic compacts by the SHS processing technique. However, in this high-pressure self-combustion process, an expensive high-pressure apparatus and complicated high-pressure assemblies, almost corresponding to conventional high-pressure sintering, are required. One of the advantages of SHS processing is that it does not require expensive processing equipment.

OBJECTS OF THE INVENTION

The principal object is an improved process for making compacts of high hardness materials.

A further object is improved compacts of high hardness materials.

An additional object is an improved process for such purposes characterized by simplicity of apparatus.

Another object is the use of simpler and less expensive powders as starting materials.

Other objects will be appreciated from the following detailed description of the invention.

The present invention relates to forming improved high density compacts of refractory ceramics, ceramic composites, cermets and other high hardness materials by the new and improved process comprising applying explosive shock during the exothermic sintering of said powders.

Various patentable items falling under the invention are as follows:

1. Method for dynamic compaction of high performance ceramic powders utilizing exothermic reaction heat.
   (a) Thin plate of refractory ceramics.
   (b) Coating of refractory ceramics on metal, cermets and ceramics.
   (c) Refractory ceramics layer on exothermic reaction materials.
2. Dynamic compaction of the composites of high hardness materials and exothermic reactive materials. Illustrations:
   Compositions including diamond, C—BN, $B_4C$, SiC, and $Si_3N_4$.
3. Dynamic Reaction Sintering of TiC—$Al_2O_3$ Composite.

Thermite mixture of $TiO_2$, carbon and aluminum for TiC—$Al_2O_3$ composite was shock-compressed. TiC—$Al_2O_3$ sintered compact was produced and its microhardness (Vicker's) was 550 kg/mm$^2$.

4. Dynamic Compaction of SiC Powder.

Dynamic compaction of SiC powder was performed by utilizing the heat of exothermic reactions in Ti—C system. Well sintered SiC compacts with 99% theoretical density and microhardness of 2850–3200 kg/mm$^2$ were obtained. SiC compact produced at the same shock conditions but without exothermic reaction heat showed a relative density of 98.6% and microhardness (Vicker's) of 1600–2300 kg/mm$^2$.

5. Dynamic Compaction of C—BN Composites.

Dynamic sintering of C—BN composites utilizing exothermic reactive materials as an additive was examined. The C—BN composites containing 40% C—BN with microhardness (Vicker's) of 2000 kg/mm$^2$ were obtained. Microhardness (Vicker's) of the composites containing 80% C—BN were 2200–2700 kg/mm$^2$.

6. Dynamic Reaction Sintering of $B_4C$ and $Al_4C_3$.

Synthesis and sintering of $B_4C$ and $Al_4C_3$ from the elemental constituents of these materials utilizing exothermic reaction were tried by shock compression technique. Microhardness (Vicker's) of $B_4C$ sintered compact produced by this technique was 1600–1700 kg/mm$^2$. The mixture of Al and carbon partially reacted and produced $Al_4C_3$ compact with microhardness (Vicker's) of 700–800 kg/mm$^2$.

The invention will be appreciated further by the following detailed descriptions thereof, especially those occurring in the various Examples and the Drawings.

GENERAL DESCRIPTION OF THE DRAWINGS

Referring generally to the various figures of the drawings,

FIG. 1 shows the SHS reaction scheme.

FIG. 2 shows the relation of SHS characteristics to the physical and chemical properties of the starting materials.

FIG. 3(A) is a side view of the shock wave generator.

FIG. 3(B) is a view in cross-section of a stainless steel capsule containing the pressed mixture.

FIG. 5 shows x-ray diffraction patterns of the starting powder and resulting products.

FIG. 6(A) shows the product in cross-section with pores.

FIG. 6(B) shows SEM photographs of fracture surfaces on dense regions in TiC compacts.

FIG. 7 is a view in cross-section of compacts showing pores.

FIG. 9 is an SEM photograph of a fracture surface.

FIG. 13 shows optical photographs of polished surfaces of C—BN composites.

FIG. 15 shows SEM photographs of fracture surfaces on compacts.

FIG. 16 is a view in cross-section of a plane shock wave assembly.

FIG. 17 is a view in cross-section of a cylindrical shock wave assembly.

Detailed Examples are as follows:

EXAMPLE 1

Stoichiometric mixtures of titanium and carbon powders for producing TiC were shock-compressed. Exothermic mixtures can be reacted and consolidated into TiC compacts by shock compression. The TiC compacts produced by this technique were relatively porous and had microhardness (Vicker's) of 500–700 kg/mm$^2$. The mixture of Ti—C with an additive of TiC can also be reacted and sintered, the compact of which had no large pores and its microhardness (Vicker's) was 1100–1300 kg/mm$^2$.

Experimental Procedure

Figure 4:
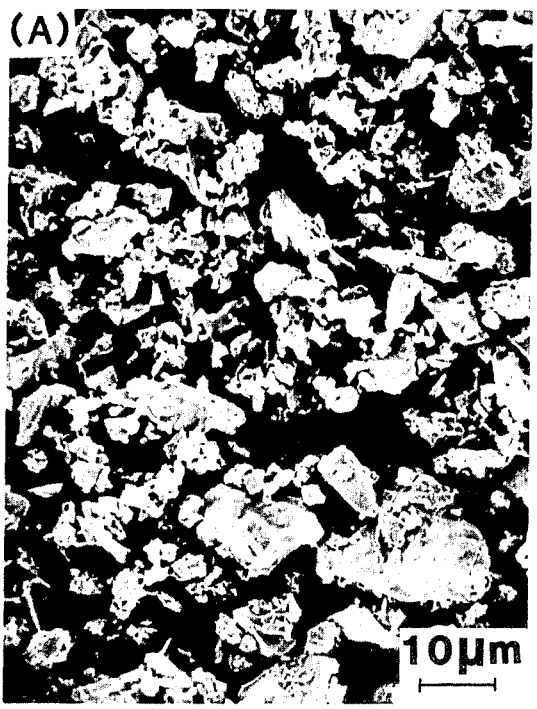
FIG. 4 is a view in cross-section of the pressed titanium and carbon powders.
Figure 4:
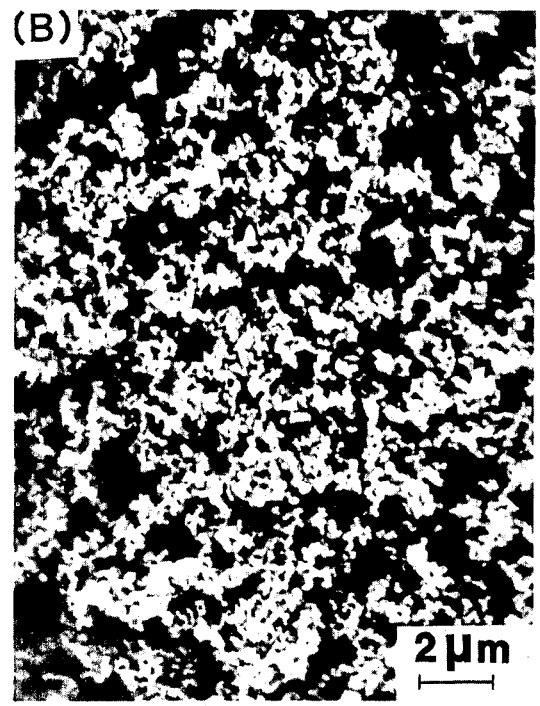
Figure 4:

Titanium powder (10 um in size) and carbon powder (0.5 um) as shown in FIG. 4, were well mixed in tolen and degased at 500° C. in $10^{-4}$ Torr. The mixture was pressed into a stainless steel capsule shown in FIG. 3(B). Shock treatments were carried out by using the flyer-type shock wave generator and momentum trap recovery system shown in FIG. 3(A). An iron flyer-plate with 4.3 mm thickness was impinged upon the capsule at velocities of 1.5, 2.0 and 2.4 km/sec. The impact pressure induced in the capsule was estimated to be 33, 45, and 60 GPa for these impact velocities. After shock treatments the products were examined by an x-ray diffractometer, microhardness tester and SEM.

It should be noted that the concept of the shock wave generator as shown in FIG. 3A, is by no means novel, but in fact has been known for many years. The theory and practice of the same and its use for other purposes is described throughout the explosive literature. A typical disclosure is that made by Dr. M. A. Cook in his book entitled "The Science of High Explosives", published by Reinhold Company. Chapter 10 of the first edition is particularly comprehensive in this connection. However, although the concept has been available for years, no one before the present inventors has used it during the exothermic sintering of compactable powders.

Results and Discussion

The x-ray diffraction patterns of the starting powder and resulting products are shown in FIG. 5. Exothermic reaction in the mixture completely took place at shock pressures above 45 GPa, but in the sample shock-compressed at 33 GPa production of TiC can be found only in the center region of the sample, which seemed to reflect the shock pressure and temperature distribution within the capsule. FIG. 6(a) shows optical photographs of polished surfaces of TiC compacts produced by this technique. The compacts obtained at 45 and 60 GPa mainly had spherical pores with a variety of sizes which were not observed in the compact produced at 33 GPa. FIG. 6(B) shows SEM photographs of fracture surfaces on relatively dense regions in TiC compacts. It can be seen that the particle size of TiC produced, which was relatively uniform in each compact, increased with increasing shock temperatures. Grain growth in TiC compacts seemed to occur after release of shock pressure rather than during shock compression. The residual temperatures are estimated to be above 3000° C. in the products shock-compressed at 45 and 60 GPa. Vapor and/or melting phase of TiC occurred at such high temperatures as to enable rapid consolidation and grain growth of the TiC particles produced by exothermic reaction. However, pores of varying size, as shown in FIG. 6(A), were introduced into the resulting products by producing the vapor phase of TiC.

Microhardness (Vicker's) of TiC compacts produced by this method was 500–700 kg/mm² for 200 g load (Table 2), which is independent of the shock conditions in the range of these experiments. This microhardness (Vicker's) is considerably low as compared with sintered TiC compacts fabricated by usual methods. This result shows that although transgranular fracture was observed locally on fractured surfaces on TiC compacts, interparticle bonding is not strong. This may be caused by the fact that sintering and grain growth of TiC particles took place after the release of shock pressure. In order to strengthen interparticle bonding, exothermic reaction of Ti—C and sintering of this product must be completed during shock compression by reducing residual temperature.

Exothermic mixture with an additive of TiC was shock-compressed in the same way as Ti—C system without an additive. In the mixture with the additive, heat generated exothermic reaction can be diffused into large TiC particles which have low shock temperature. Small pores between particles still remained in these compacts as shown in FIG. 7, but no large pores are seen in the compacts without the additive. Particle size of the TiC produced from the mixture with the additive had some distribution and was smaller than that without the additive. Microhardness (Vicker's) value of this compact was 1100–1300 kg/mm² for 200 g load.

TABLE 2

Microhardness of TiC compacts

| Composition (wt %) | Initial density (%) | Impact Pressure (GPa) | Microhardness (kg/mm²) |
|---|---|---|---|
| Ti80—C20 | 80 | 60 | 600–700 |
|  | 60 | 60 |  |
|  | 60 | 45 | 500–700 |
|  | 60 | 33 |  |
| Ti48.5—Ti38.8—C12.7 | 60 | 60 | 1100–1300 |

EXAMPLE 2

Dynamic Reaction Sintering of TiC—Al₂O₃ Composite

Synthesis and sintering of TiC—Al₂O₃ composite from its precursory mixture of TiO₂, carbon and aluminum was tried by the shock-compression technique. A thermite mixture was reacted at shock pressure of 45 GPa. The resulting composite was relatively porous and consisted of large TiC and small Al₂O₃ particles. Microhardness (Vicker's) of this composite was about 550 kg/mm² for 200 g load.

Experimental Procedure

TiO₂ (10 μm size), carbon black (0.5 μm) and aluminum (10 μm) powders were mixed in tolen and degased at 500° C. in $10^{-4}$ Torr. This mixture was pressed into a capsule. Shock treatment at 45 GPa was performed in the same manner as in the experiment of Example 1.

Results and Discussion

Figure 8:
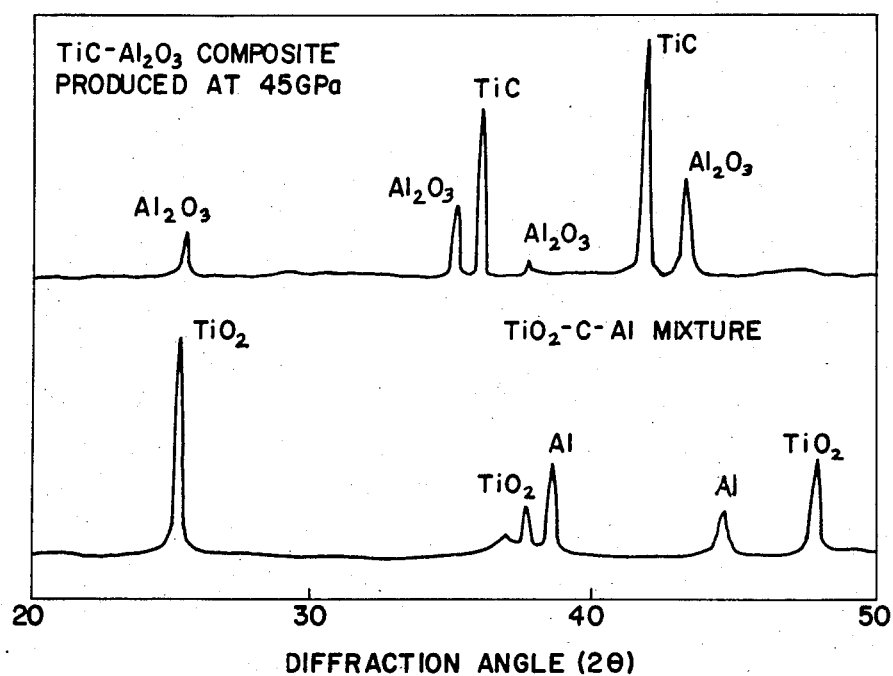
FIG. 8 is a graph defining diffraction patterns.

The x-ray diffraction patterns of mixed powder and the resulting products are shown in FIG. 8. Thermite reaction in the mixture of TiO₂, carbon and aluminum was completed at 45 GPa. The calculated weight ratio of Al₂O₃ and TiC in this product is estimated to be 52.9:47.1%.

FIG. 9 shows the SEM photograph of a fractured surface in the Al₂O₂—TiC composite produced by this technique. Apparent particle size of the products is 1–5 μm, but these particles consisted of more finer grains with a size 0.1 μm as shown in FIG. 9. This composite was made by agglomerates of such fine grains and pores of various sizes.

In this dynamic reaction system additives such as TiC and Al₂O₃ are important in controlling the thermite reaction speed and heat for producing well sintered composites.

Microhardness (Vicker's) of TiC compacts produced by this method were 500–700 kg/mm² for 200 g load (Table 2), which is independent of the shock conditions in the range of these experiments. This microhardness (Vicker's) is considerably low as compared with sintered TiC compacts fabricated by usual methods. This result shows that although transgranular fracture was observed locally on fractured surfaces of TiC compacts, interparticle bonding is not strong. This may be caused by the fact that sintering and grain growth of TiC particles took place after the release of shock pressure. In order to strengthen interparticle bonding, exothermic reaction of Ti—C and sintering of this product must be completed during shock compression by reducing residual temperature.

Exothermic mixture with an additive of TiC was shock-compressed in the same way as Ti—C system without an additive. In the mixture with the additive, heat generated exothermic reaction can be diffused into large TiC particles which have low shock temperature. Small pores between particles still remained in these compacts as shown in FIG. 7, but no large pores are seen in the compacts without the additive. Particle size of TiC produced from the mixture with the additive had some distribution and was smaller than that without the additive. Microhardness (Vicker's) value of this compact was 1100–1300 kg/mm$^2$ for 200 g load.

EXAMPLE 3

Dynamic Compaction of SiC Powder

Dynamic compaction of SiC powders without additives was performed by utilizing the heat of exothermic reactions. Well sintered SiC compacts with 99% theoretical density and microhardness (Vicker's) of 2850–3200 kg/mm$^2$ were obtained. SiC compacts produced with the same shock conditions but without exothermic reaction heat showed a relative density of 98.6% and microhardness (Vicker's) of 1600–2300 kg/mm$^2$.

Experimental Procedure

Figure 10:
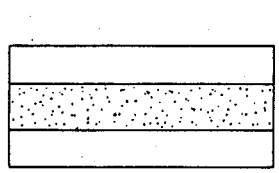
FIG. 10 is a cross-sectional depiction of a powder assembly.

SiC (5–10 μm size) powder without additive was pressed with initial density of 60% of theoretical and placed between the formed exothermic mixtures Ti—C or TiO$_2$—C—Al, as shown in FIG. 10. This green compact with sandwich structure consisted of SiC. Exothermic mixtures were charged in a stainless steel capsule and shock-compressed at pressures of 45 GPa. Shock treatments were performed in the same manner as the experiments in Example 1.

Results and Discussion

Exothermic reactions in the mixtures of Ti—C and TiO$_2$—C—Al at this shock condition (45 GPa) had been confirmed by prior experiments. Results of dynamic compactions of SiC powder by utilizing reaction heat showed nearly full density (99%) and had a microhardness (Vicker's) of 2850–3200 kg/mm$^2$ for 500 g load, which almost corresponds to that of SiC single crystal. On the other hand, SiC compact produced at the same shock conditions but without reaction heat had a relative density of 98.6% and a microhardness of 1600–2300 kg/mm$^2$ for 500 g load.

Figure 11:
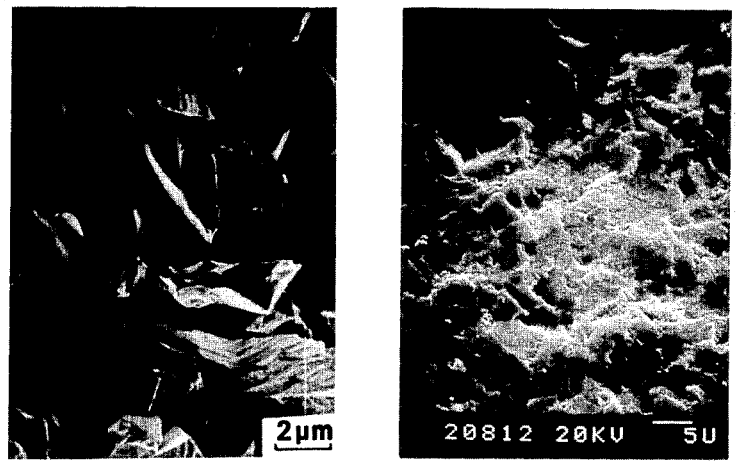
FIG. 11 shows SEM photographs of a fracture surface.

FIG. 11 shows SEM photographs of transgranular fractured surfaces in the SiC compact produced by this technique. No fine cracks can be seen inside SiC grains.

Fine grains (1 μm) along the interparticles which cannot be seen in the SiC compact obtained without exothermic reaction heat, were detected. This shows that crystallization from vapor and/or liquid phases of SiC took place between the grain boundaries. It is considered that consolidation of SiC powder which should be compacted to the full density of SiC at the shock-wave front can be promoted by the formations of such vapor and/or melting phases by the heat of shock-compression and exothermic reaction.

Figure 12:
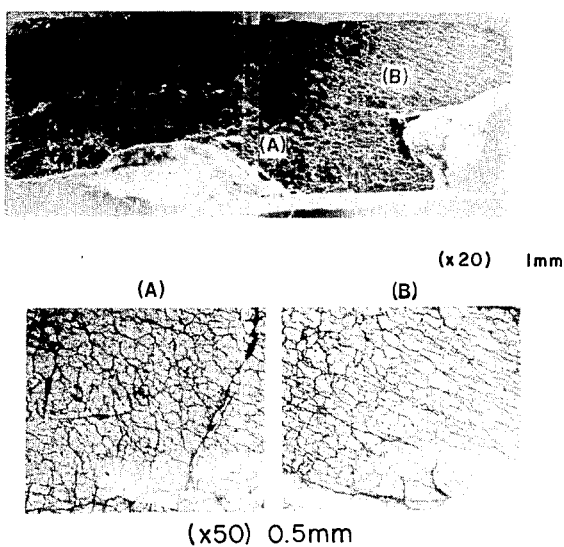
FIG. 12 shows optical photographs of polished surfaces on sintered compacts.
Figure 12:
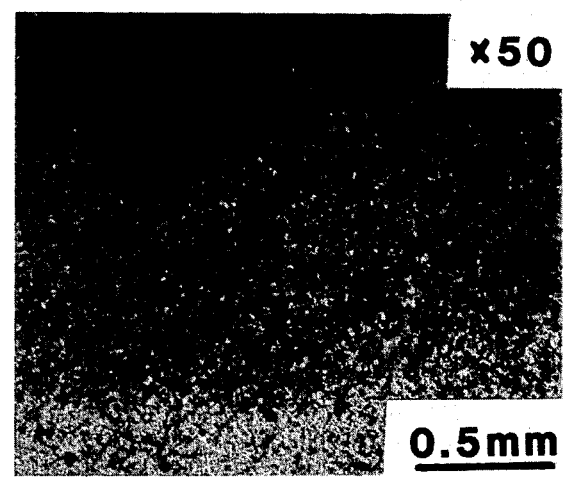

FIG. 12 shows optical photographs of polished surfaces of SiC sintered compacts produced with and without exothermic reaction heat. No fine cracks were detected in the compact obtained with exothermic reaction heat. However, in the compact produced without reaction heat, macro- and micro-cracks were remarkable as seen in the photographs. Heat transmitted from the exothermic reaction mixture to the compact seemed to act effectively on consolidation of SiC powder as well as annealing of SiC sintered compact.

These preliminary results show that SiC powder without additive can be consolidated to its theoretical density and macro- and micro-cracks in the compact, which have seemed to be an inevitable problem in shock compaction of ceramic powders, are possible to eliminate by annealing under high residual temperature.

TABLE 3

| Sample assembly | Results of SiC compacts | |
|---|---|---|
| | SiC compact | |
| | Relative density (%) | Microhardness (kg/mm$^2$) |
| SiC | 98.6 | 1600–2300 |
| Sic with Ti—C | 99 | 2840–3080 |
| SiC with TiO$_2$—C—Al | 99 | 2840–3170 |

EXAMPLE 4

Dynamic Compaction of C—BN Composites

Dynamic compaction of C—BN composites utilizing exothermic reaction of the mixtures of Ti—C and Ti—Al, as additives, was performed. Microhardness of resulting C—BN composites increased remarkably by additions of exothermic reactive materials. The composites containing 40% C—BN with microhardness (Vicker's) of 2000 kg/mm$^2$ were obtained, and composites containing 80% C—BN with additives of Ti—B and Ti—Al had microhardness (Vicker's) of 2200–2700 kg/mm$^2$, which is a little lower than that of composites produced at static high pressures.

Experimental Procedure

C—BN powder (1–5 μm size) and exothermic reaction powders were dry-mixed by aluminum mortar and pestle. The mixtures of C—BN, TiC and Al powders were prepared in the same manner and the mixtures were pressed into a capsule. Shock treatments at 60 GPa were carried out in the same manner as the experiments of Example 1.

Results and Discussion

Microhardness of resulting C—BN composites from the mixtures with and without exothermic materials is listed in Table 4. The best C—BN composite without exothermic materials had microhardness (Vicker's) of 700–900 kg/mm$^2$ for 500 g load, and had many macro- and micro-cracks. In the system of C—BN and exothermic mixtures, well-sintered C—BN composites containing 40% C—BN with microhardness (Vicker's) of 1700–2000 kg/mm$^2$ for 500 g load were obtained. Hardened steel with hardness H$_{Rc}$ 50–60 can be machined by these sintered composites. Composites containing 80% C—BN with additives of Ti—B and Ti—Al had higher microhardnesses (Vicker's) of 2200–2700 kg/mm$^2$ for 500 g load, which is a little lower than that of composites produced at static high pressure. These sintered C—BN composites can also be applied to cutting tools for hardened high-speed steel and super alloys. FIG. 13 shows optical photographs of polished surfaces of the sintered C—BN composites with and without exothermic materials. The composites produced from the mixture with C—BN and exothermic materials have a few macro-cracks, but no micro-cracks, which can be seen in the composite without exothermic materials. Exothermic reaction heat seemed to act on sintering between C—BN and exothermic materials as well as annealing of resulting C—BN composites, a phenomenon which can be observed in the sintering of SiC powder utilizing exothermic reaction heat.

Although numerous thermite type and intermetallic reaction type mixtures have been disclosed herein, there are of course many more which would be suitable.

A comprehensive article on the formation of intermetallic compounds, most of which are formed exothermically, is the article entitled "Intermetallic Compounds: Their Past and Promise", set forth in *Metallurgical Transactions A*, Volume 8A, September 1977, at page 1327 et seq. This article records the 1976 Campbell Memorial Lecture at the American Society for Metals. Attention is directed particularly to the footnotes and the literature references at the end of this article.

Other articles of interest include "Propagation of Gasless Reactions in Solids", appearing in *Combustion and Flame* 21, *pages* 77–89 (1973). This article sets forth an Analytical Study of Exothermic Intermetallic Reaction Rates. The authors are A. P. Hardt and P. V. Phung.

The prior art also includes an article from the *Russian Journal of Physical Chemistry*, 46 (3) 1972, at pages 431 et seq., entitled Measurement of the Heat of Formation of Intermetallic Compounds by the Sintering Method in an Isothermal Calorimeter, by Gorelkin et al.

TABLE 4

| Microhardness of C—Bn composites (Vicker's) | | |
|---|---|---|
| Composition (wt %) | Initial density (%) | Microhardness (kg/mm$^2$) |
| c-BN50 — TiC—Al | 65 | 500–600 |
|  | 62.5 |  |
|  | 57.5 | 700–900 |
|  | 54.5 | 500–600 |
|  | 50 | 400–500 |
| c-BN50 — TiC—Al + <u>Ti—C</u> | 65 | 1000–1300 |
|  | 57.5 | 1800–2000 |
| c-BN40 — TiC—Al + <u>Ti—B</u> | 57.5 | 1800–2000 |
| c-BN80 + <u>Ti—B</u> + <u>Ti—Al</u> | 57.5 | 2200–2700 |
| c-BN80 + <u>Ti—Al</u> | 57.5 | 1800–2200 |

EXAMPLE 5

Dynamic Reaction Sintering of B$_4$C and Al$_4$C$_3$

Synthesis and sintering of B$_4$C and Al$_4$C$_3$ from the elemental constituents of these materials by utilizing exothermic reaction of Ti—C were tried under shock compression. Microhardness (Vicker's) of B$_4$C sintered compact produced from a stoichiometric mixture of boron and carbon was 1600–1700 kg/mm$^2$. The mixture of Al and C reacted to produce Al$_4$C$_3$ sintered compact, which had a microhardness (Vicker's) of 700–800 kg/mm$^2$.

Experimental procedure

Powder mixtures of B—C and Al—C were prepared by dry milling. These mixtures were pressed with initial density of 60% of theoretical and placed between a formed exothermic mixture of Ti—C. These green compacts with a sandwich structure consisting of sample and exothermic mixtures were charged in a stainless steel capsule and shock-compressed at pressure of 60 GPa. Shock treatments were performed in the same manner as the experiments of Example 1.

Results and Discussion

Figure 14A:
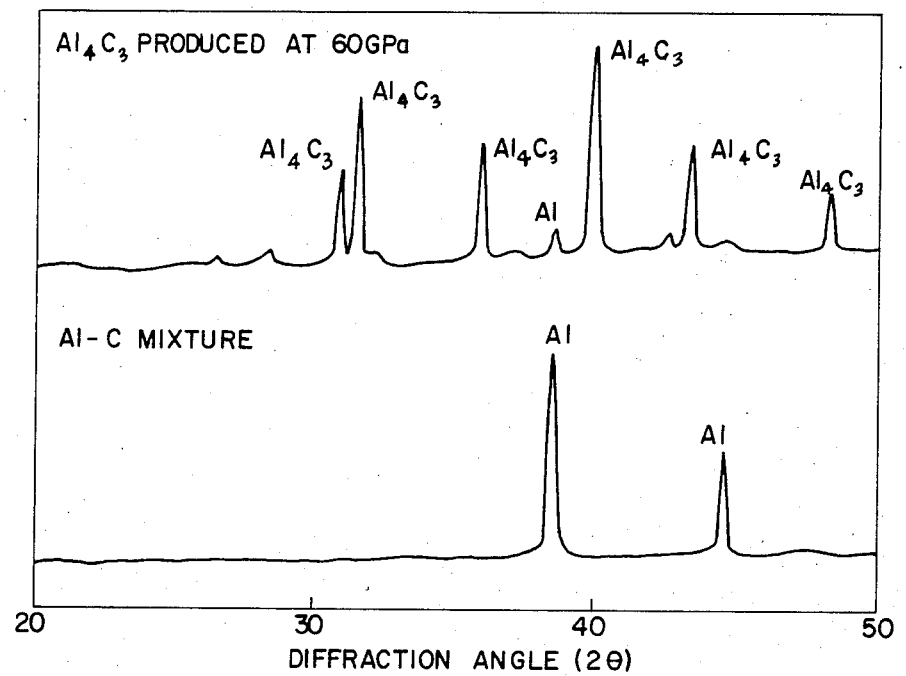
FIG. 14(A) shows x-ray diffraction pattern in Al—C.
Figure 14B:
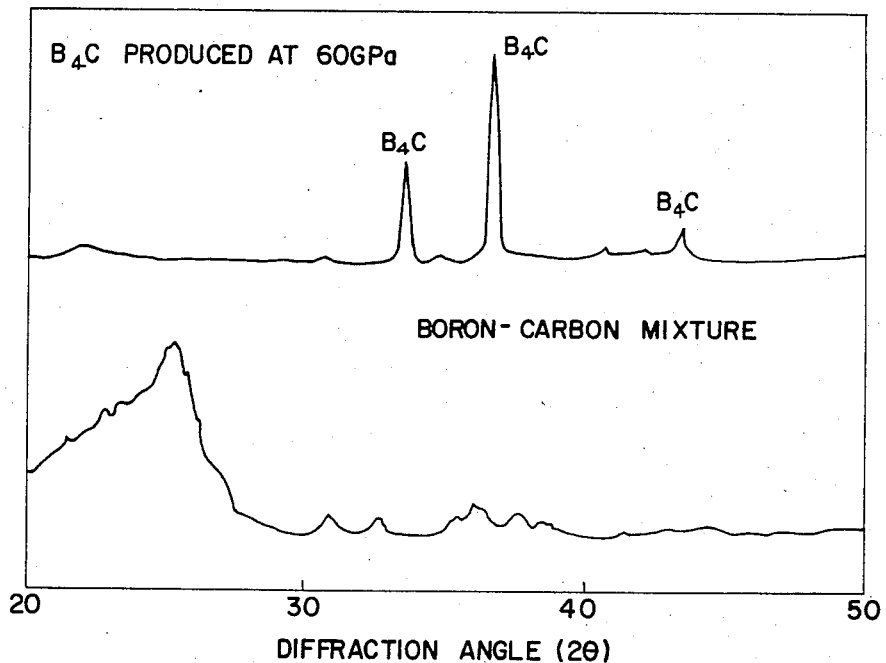
FIG. 14(B) shows x-ray diffraction pattern in B—C.

Reactions in stoichiometric mixtures of B—C and Al—C are exothermic but not self-sustaining. X-ray diffraction patterns of these mixed powders and resulting products are shown in FIG. 14. These mixtures reacted and produced B$_4$C and Al$_4$O$_3$ for B—C and Al—C, respectively. FIG. 15(A) shows SEM photographs of fractured surfaces in these compacts. Grain growth of Al$_4$C$_3$ particles took place up to 5 $\mu$m in size. Resulting Al$_4$C$_3$ compacts seemed to be relatively porous, with microhardnesses (Vicker's) of 700–800 kg/mm$^2$ for 500 g load. On the other hand, the B$_4$C compact produced from B—C mixture was made by agglomerates consisting of fine grains, but had locally dense regions as seen in FIG. 15(B). Microhardness (Vicker's) of this B$_4$C compact was 1600–1700 kg/mm$^2$ for 500 g load. These preliminary results show that it is possible to synthesize and simultaneously consolidate refractory materials by utilizing heat of exothermic reaction and shock compression, even if these materials cannot be synthesized by self-propagating reaction.

It will be appreciated from the foregoing description of the invention, as contrasted with the description of the prior art, that the present invention has achieved many improvements over the prior art. Notably, the invention permits the achievement of improved compacts with respect to density, hardness, pore disposition and appearance. Furthermore, it permits the use of less expensive and less complicated powders. It permits the achievement of these improvements while eliminating the more complicated pressure devices of the prior art. It also simplifies the heating of the ingredients as contrasted with the more complicated furnaces of the prior art.

It will be appreciated that many additional advantages will appear from the use of the principles of the invention, which are not limited to the foregoing embodiments, but may include many variations normally deduced from the invention.

For instance, variations can be made in the assembly for shock compression experiments as set forth in FIG. 3. Typical variations are depicted in FIGS. 16 and 17.

Describing these figures in greater detail, in the assembly of FIG. 3 the detonation of the explosive propels the glass into the main explosive, resulting in a plane detonation. By the detonation of the main explosive, the flyer plate is propelled against the capsule at a particular velocity, and then the plane shock wave is transmitted to the sample through the capsule.

FIG. 16 shows a plane wave generator with two different explosives: The inside explosive has a detonation velicity of Vd1 lower than the outside explosive with detonation velocity Vd2. The angle $\theta$ is decided by the following equation: Sin $\theta$ equals (Vd1/Vd2). Plane detonation is transmitted to the main explosive. By this detonation the flyer plate is propelled against the capsule at a determined velocity, and then the plane shock wave is transmitted to the sample through the powder container.

FIG. 17 describes a cylindrical shock wave assembly functioning as follows: After ignition of the detonator, the detonation front travels down the tube wall at a determined velocity, and generates a cylindrical shock wave leading to the compression of the powder container and capsule.

Many other variations may be made without departing from the spirit and scope of the invention. Accordingly, we intend to be limited only by the following patent claims:

We claim:

1. An improved process for forming compacts of powders of ceramics, cermets and other high hardness materials which comprises applying explosive shock with exothermic sintering of such powders.

2. An improved process for forming compacts of powders of ceramics, cermets, and other high hardness materials which comprises applying explosive shock with the exothermic sintering, which is achieved by mixing the exothermic ingredients with the powders to be compacted.

3. An improved process for forming compacts of powders of ceramics, cermets and other high hardness materials, which comprises applying explosive shock with the exothermic sintering of such powders, said sintering being accomplished by providing at least one separate layer of the exothermic composition adjacent to the powder to be compacted.

4. The process for the reaction sintering of a plurality of powdered ingredients to form a compact of a composite, which process comprises applying explosive shock to said powders and heating with an exothermic composition.

5. The process of claim 4 wherein the powder mixture was titanium oxide, carbon and aluminum, the exothermic reaction mixture was a thermite mixture, and the resulting composite was titanium carbide—aluminum oxide ($TiC—Al_2O_3$).

6. The process of claim 3 wherein the powder to be compacted is silicon carbide (SiC) and the exothermic compositions are disposed in separate layers above and below the silicon carbide layer, and are selected from the group consisting of titanium and carbon (Ti—C) and titanium oxide—carbon—aluminum ($TiO_2$—C—Al).

7. The process of claim 2 wherein the exothermic ingredients mixed in are titanium and carbon (Ti—C) and titanium and aluminum (Ti—Al) and the powder to be compacted is cubic boron nitride.

8. The process of claim 3 wherein a powder compact of boron carbide ($B_4C$) was prepared by shock sintering between exothermic sandwich layers of titanium and carbon mixtures.

9. The process of claim 3 wherein a powder compact of aluminum carbide ($Al_4C_3$) was prepared by shock sintering between exothermic sandwich layers of titanium and carbon mixtures.

10. Improved compacts of powders of ceramics, cermets and other high hardness materials characterized by enhanced hardness as a result of applying explosive shock to the powders with exothermic sintering of such powders.

11. An assembly for producing compacts of powders of ceramics, cermets and other high hardness materials, which comprises a powder receptacle, exothermic composition, and an explosive shock wave generator.

* * * * *